United States Patent
Lee et al.

(10) Patent No.: US 12,039,211 B2
(45) Date of Patent: Jul. 16, 2024

(54) BILLING AND SECURITY FOR IMAGE FORMING OPERATION IN EXTERNAL IMAGE FORMING APPARATUS

(71) Applicant: Hewlett-Packard Development Company, L.P., Spring, TX (US)

(72) Inventors: Seungyul Lee, Seongnam-si (KR); Myonghun Cho, Seongnam-si (KR); Hyejung Jang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/023,478

(22) PCT Filed: Jan. 25, 2021

(86) PCT No.: PCT/US2021/014855
§ 371 (c)(1),
(2) Date: Feb. 27, 2023

(87) PCT Pub. No.: WO2022/066202
PCT Pub. Date: Mar. 31, 2022

(65) Prior Publication Data
US 2024/0012594 A1    Jan. 11, 2024

(30) Foreign Application Priority Data

Sep. 25, 2020   (KR) .................. 10-2020-0125262

(51) Int. Cl.
*G06F 3/12*     (2006.01)
(52) U.S. Cl.
CPC .......... *G06F 3/1239* (2013.01); *G06F 3/1207* (2013.01); *G06F 3/1222* (2013.01);
(Continued)

(58) Field of Classification Search
CPC ...... G06F 21/32; G06F 3/1206; G06F 3/1285; G06F 3/1205; G06F 3/1204;
(Continued)

(56) References Cited

U.S. PATENT DOCUMENTS 7,728,994 B2 *  6/2010  Fujimori ............ H04N 1/32138
                                                    399/49
8,502,997 B2     8/2013  Chae et al.
(Continued)

FOREIGN PATENT DOCUMENTS

JP      2004-258961 A    9/2004
JP      2014-186686 A    10/2014
KR     10-2005-0034459 A  4/2005

*Primary Examiner* — Negussie Worku
(74) *Attorney, Agent, or Firm* — Brooks, Cameron & Huebsch, PLLC

(57) ABSTRACT

An example electronic apparatus includes a communication unit, a user interface unit, a processor, and a memory. The processor is to execute instructions stored in the memory to receive, from the user interface unit, a request for an image forming operation on a document, obtain, by a first driver, a result of whether to approve the image forming operation, based on user information, from a server through the communication unit, when the image forming operation is approved, transmit, by the first driver, print data corresponding to the image forming operation to a second driver for the image forming operation, request, by the second driver, an image forming apparatus to perform the image forming operation, and, when the image forming operation is performed, transmit, by the first driver, history information corresponding to a result of the image forming operation to the server through the communication unit.

15 Claims, 13 Drawing Sheets

(52) U.S. Cl.
CPC .......... *G06F 3/1229* (2013.01); *G06F 3/1238* (2013.01); *G06F 3/1259* (2013.01); *G06F 3/1273* (2013.01); *G06F 3/1285* (2013.01)

(58) Field of Classification Search
CPC ...... G06F 3/1212; G06F 3/1238; G06F 3/125; G06F 3/126; G06F 3/1276; G06F 2221/2111; G06F 3/1286; G06F 3/1288; G06F 21/62; G06F 21/629; G06F 21/84; G06F 3/1207; G06F 3/1222; G06F 3/1225; G06F 3/1231; G06F 3/1241; G06F 3/1245; G06F 3/1259; G06F 21/31; G06F 3/1227; G06F 3/1239; G06F 3/1229; G06F 3/1273; H04L 63/08; H04L 63/102; H04L 12/2803; H04L 61/4541; H04L 65/103; H04L 65/104; H04L 65/1101; H04L 65/1106; H04L 65/4038; H04L 67/02; H04L 67/104; H04L 67/1046; H04L 67/1048; H04L 67/1068; H04L 67/1076; H04L 67/1078; H04L 67/303; H04L 69/12; H04L 69/24; H04L 69/326; H04L 9/40; G06T 1/0021; G06T 1/005; G06T 2201/0051; G06T 2201/0064; B41J 11/009; B41J 2/04541; B41J 2/04543; B41J 2/0458; B41J 2/04596; B41J 2/2103; B41J 2/2125; B41J 29/38; B41J 3/60; B41J 3/4075; B41J 3/445; G06Q 10/10; G11B 15/68; G11B 15/6835; G11B 17/22; G11B 17/225; G11B 23/40; G11B 33/12; H04B 7/18513

USPC ....................................................... 358/1.15
See application file for complete search history.

(56) References Cited

U.S. PATENT DOCUMENTS

| | | | |
|---|---|---|---|
| 9,250,833 B2 | 2/2016 | Kim | |
| 2006/0200814 A1* | 9/2006 | Kontinen | G06F 8/61 717/168 |
| 2007/0196154 A1* | 8/2007 | Ebuchi | B41J 2/2135 400/62 |
| 2011/0109930 A1 | 5/2011 | Eom et al. | |
| 2011/0149314 A1* | 6/2011 | Kim | G06F 3/1205 358/1.9 |
| 2013/0235402 A1* | 9/2013 | Yamamichi | G06F 3/1224 358/1.13 |
| 2014/0320883 A1 | 10/2014 | Ichida | |
| 2015/0188795 A1* | 7/2015 | Hoen, IV | G06F 11/3006 709/224 |
| 2016/0105587 A1* | 4/2016 | Sugiyama | G06F 3/1285 358/1.14 |
| 2016/0323478 A1* | 11/2016 | Tsutsumi | H04N 1/00307 |
| 2017/0134609 A1 | 5/2017 | Park et al. | |
| 2018/0096155 A1 | 4/2018 | Ryu et al. | |
| 2019/0034131 A1* | 1/2019 | Crisolo | G06F 3/1259 |
| 2019/0050184 A1* | 2/2019 | Ozawa | G06F 3/1222 |
| 2019/0163420 A1* | 5/2019 | Taima | G06F 21/608 |

* cited by examiner

FIG. 6

NOTIFICATION!!

AN ERROR OCCURRED DURING PRINTING.
WHEN YOU FINISH PRINTING, PLEASE ENTER ACTUALLY PRINTED PAGES.
NUMBER OF PAGES PRINTED: ☐ —— 610

BILLING AND SECURITY FOR IMAGE FORMING OPERATION IN EXTERNAL IMAGE FORMING APPARATUS

BACKGROUND

A driver of an image forming apparatus may be installed in an electronic apparatus of a user. The driver of the image forming apparatus may include a set of instructions or a program used by the electronic apparatus to control the image forming apparatus or to transmit data to the image forming apparatus.

When the electronic apparatus receives a print command for a certain document, the electronic apparatus transmits print data of the certain document to the image forming apparatus. The image forming apparatus may output a printout of the certain document, based on the print data received from the electronic apparatus.

BRIEF DESCRIPTION OF THE DRAWINGS

FIG. 6 is a diagram showing a user interface displayed on an electronic apparatus when an image forming operation is abnormally completed according to an example.

DETAILED DESCRIPTION

Figure 1A:
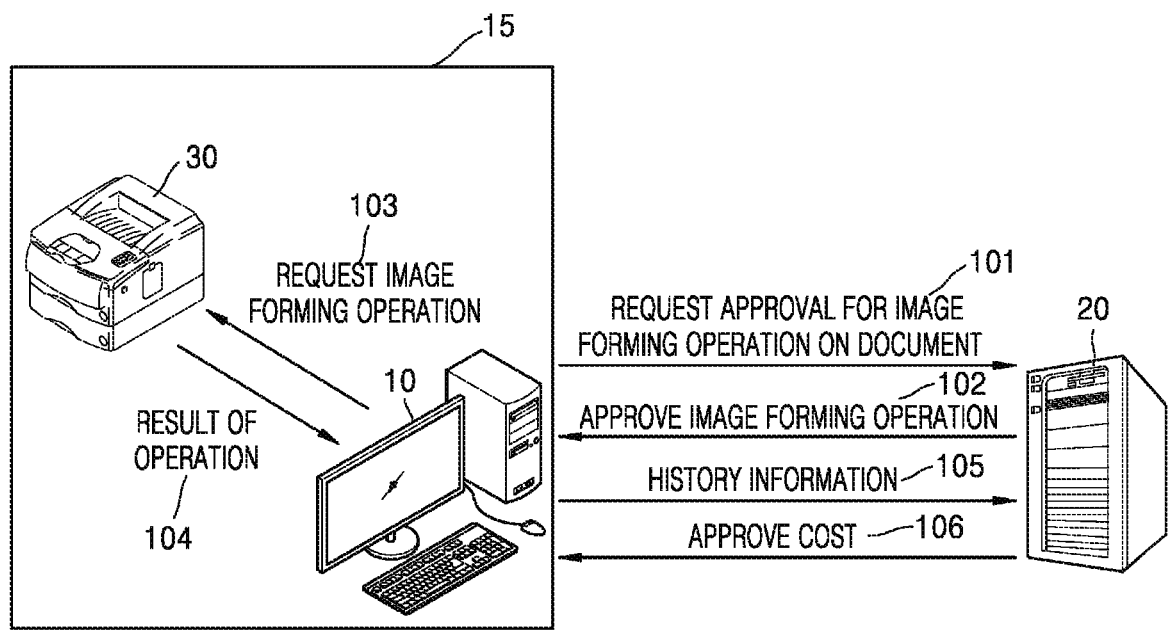
FIGS. 1A and 1B illustrate a process in which an electronic apparatus receives approval for an image forming operation of a document and calculates a cost for a completed image forming operation according to an example.

Hereinafter, examples will be described with reference to the accompanying drawings for one of ordinary skill in the art to execute the examples. However, the disclosure may include various different examples and is not limited to the examples set forth herein.

An "electronic apparatus" may be an apparatus that receives a command of a user and displays information processed according to the command of the user. For example, the electronic apparatus may be an apparatus such as a computer, a personal computer (PC), a tablet PC, a personal digital assistant (PDA), a laptop, a smartphone, a mobile phone, or the like. A program used for an image forming operation on a certain document may be installed in the electronic apparatus.

A "first driver" for billing and security of an image forming operation may be installed in the electronic apparatus. The "first driver" may be a driver for receiving approval for an operation of an image forming apparatus from a server, requesting the image forming apparatus to perform an image forming operation, requesting the server to process a cost of the image forming operation, or the like.

A "second driver" for controlling an image forming apparatus may be installed in the electronic apparatus. The "second driver" may be a driver for transmitting a command for the electronic apparatus to control an image forming apparatus, receiving certain information from the image forming apparatus, or the like. For example, the second driver may transmit a command for an image forming operation to an image forming apparatus. In addition, the second driver may be installed in the electronic apparatus separately from the first driver or may be integrated with the first driver and installed in the electronic apparatus.

An "image forming apparatus" may be any type of apparatus capable of performing an image forming operation, such as a printer, a copier, a scanner, a fax machine, a multi-function printer (MFP), or a display apparatus. In addition, the image forming apparatus may be a two-dimensional (2D) image forming apparatus or a three-dimensional (3D) image forming apparatus. An "image forming operation performed by the image forming apparatus" may be an operation related to printing, copying, scanning, faxing, storage, transmission, coating, etc.

A "server" may be an apparatus for billing and cost processing for an image forming operation performed through the electronic apparatus. For example, an image forming operation may be an image forming operation on a document requiring security. For example, the document requiring security may be a company's internal document, a document including personal information, a contract, etc. By monitoring an operation of an electronic apparatus of a user, the "server" may prevent leakage of the document requiring security and may accurately calculate a cost of a completed image forming operation. In addition, the "server" is not limited to operations related to billing and cost processing. In addition, the "server" may be implemented as one or more servers.

For example, when a user intends to output a company's internal document on a personal image forming apparatus of the user through an electronic apparatus outside the company, a security check on the company's internal document may be required. When the company's internal document includes confidential information, the confidential information may be leaked due to the output of a printout, and accordingly, output of the company's internal document may be restrictively approved. For example, the output of the company's internal document may be restrictively approved based on information of the user requesting output of the company's internal document, information regarding a level of the company's internal document, or the like. In addition, when an image forming operation due to company work is performed in an external image forming apparatus, an electronic apparatus may obtain print setting information used to compute a cost of the image forming operation and may request the server for cost calculation according to the print setting information after the image forming operation is completed.

"User information" may be information identifying a user. For example, information identifying a user may include a name of a user, an identification (ID) of a user, an employee number of a user, a department in which a user works, a registration number of an electronic apparatus of a user, etc. In addition, "user information" may include information of an authority level allowing a user to access a certain document.

"Level information" regarding a document may be information indicating a grade set based on a title of a document, content included in a document, a type of a document, or the like. For example, the document may be a general document accessible to an unspecified person or a security document restrictively accessible to a particular person or a particular group. For example, level information of a document may correspond to authority level information of a user.

"Print setting information" may refer to information used to compute a cost of an image forming operation. For example, print setting information may include page information of a document, page layout information of a document, print style information, information of whether or not to perform a color operation of an image forming operation, or the like.

"History information" may refer to information corresponding to a result of an image forming operation. For example, history information may refer to information indicating a history of an image forming operation. As an example, history information may include information in which a user has requested an image forming operation on a document, information of a result of the image forming operation, print setting information regarding a document actually printed according to the image forming operation, or the like.

An "electronic code" may be used to confirm a history of a user who has requested an image forming operation. For example, the electronic code may be represented as a letter, a number, a symbol, a figure, or the like. For example, the electronic code may be a barcode, a Quick Response (QR) code, etc. For example, the electronic code may include information in which user information is encrypted. In addition, the electronic code may include information in which user information and print setting information are encrypted.

Figure 1B:
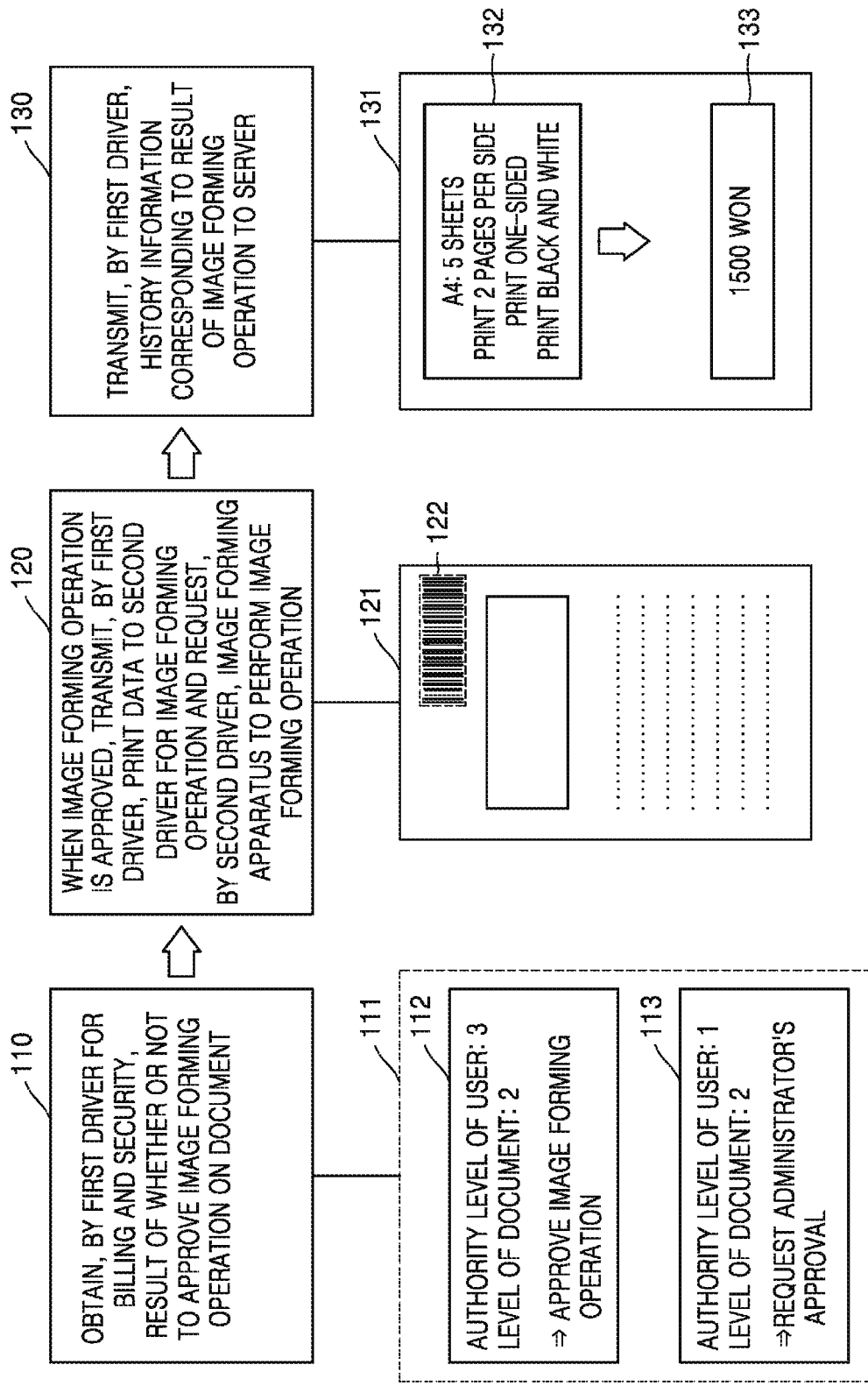

FIGS. 1A and 1B illustrate a process in which an electronic apparatus receives approval for an image forming operation of a document and calculates a cost for a completed image forming operation according to an example.

Referring to FIG. 1A, while working from home or non-face-to-face (e.g., remotely), a user may output a company's internal document on a personal image forming apparatus 30 or a public image forming apparatus 30 outside the company. In this case, a security check on the document and a cost calculation for document output may be performed.

For example, an electronic apparatus 10 of the user may receive a command for an image forming operation. For example, the image forming apparatus 30 may be located remotely from the company. The electronic apparatus 10 may be connected to the image forming apparatus 30 through a network 15. For example, the image forming apparatus 30 may be a personal image forming apparatus of the user or a public image forming apparatus used outside the company. Before requesting the image forming apparatus 30 to perform an image forming operation on the document, the electronic apparatus may confirm whether the image forming operation of the document meets a security standard or not.

In operation 101, the electronic apparatus 10 may request a server to approve an image forming operation on the document. In this case, the electronic apparatus 10 may transmit user information and level information of the document to the server 20. In operation 102, the server 20 may confirm whether the image forming operation meets security a standard or not, based on the user information and the level information of the document. Based on a result of the confirmation, the server 20 may determine whether or not to approve the image forming operation and may transmit a result of whether or not to approve the image forming operation to the electronic apparatus 10.

For example, when the image forming operation is approved, the electronic apparatus 10 may request the image forming apparatus 30 to perform the image forming operation of the document in operation 103. When the image forming operation of the document is performed in the image forming apparatus the image forming apparatus 30 may transmit a result of the image forming operation to the electronic apparatus 10 in operation 104. For example, the image forming apparatus 30 may transmit status information of the image forming apparatus 30 to the electronic apparatus 10.

In operation 105, the electronic apparatus 10 may obtain history information corresponding to the result of the image forming operation, based on the status information of the image forming apparatus 30. The electronic apparatus 10 may transmit the history information to the server 20. For example, the history information may include information in which the user has requested the image forming operation on the document, information of the result of the image forming operation, print setting information regarding a document actually printed according to the image forming operation, or the like. In operation 106, the server 20 may approve a cost for the image forming operation, based on the history information.

Referring to FIG. 1B, the electronic apparatus 10 may obtain, in a first driver for billing and security, a result of whether or not to approve an image forming operation on the document as illustrated in block 110. For example, the first driver may obtain a result of whether or not to approve the image forming operation, based on user information and level information of the document.

For example, the first driver may transmit user information and level information of the document to the server 20 and may receive a result of whether or not to approve the image forming operation determined based on the user information and the level information of the document from the server 20. In addition, the first driver may obtain level information of the document and may obtain a result of whether or not to approve the image forming operation, based on user information and the level information.

For example, the user information may include information identifying a user and information of an authority level allowing a user to access a certain document. The level information regarding the document may include information of a level set according to information included in the document.

Referring to block 111 of FIG. 1B, a result of whether or not to approve the image forming operation may be obtained based on a result of comparing an authority level of the user and a level of the document with each other. For example, referring to block 112 of FIG. 1B, when an authority level of the user is higher than a level of the document, the image forming operation may be approved. On the other hand, referring to block 113 of FIG. 1B, when an authority level of the user is lower than a level of the document, the image forming operation may be disapproved. In this case, the user may request an administrator to approve the image forming operation and may perform the image forming operation after being approved.

Referring to block 120 of FIG. 1B, when the image forming operation is approved, the electronic apparatus 10 may transmit, in the first driver, print data to a second driver for the image forming operation and may request, in the second driver, the image forming apparatus 30 to perform the image forming operation.

For example, the first driver may insert data in which user information is encrypted into print data of the document. For example, data in which user information is encrypted may be electronic code data corresponding to an electronic code in which user information is encrypted. The electronic code may be a code generated by the server 20 for billing and security regarding the image forming operation.

For example, the first driver may transmit print data, in which data in which user information is encrypted is inserted, to the second driver. The second driver may request the image forming apparatus 30 to perform the image forming operation, based on the print data in which data in which user information is encrypted is inserted. The image forming apparatus 30 may perform the image forming operation of the document according to the print data. For example, an electronic code 122 in which user information is encrypted may be inserted in a printout 121 generated from the image forming operation. Because the electronic code 122 is included in the printout 121, the user having output the printout 121 may be easily detected when security responsibility for the printout 121 arises.

Referring to block 130 of FIG. 1B, the electronic apparatus 10 may transmit, in the first driver, history information corresponding to a result of the image forming operation to the server 20. The history information may include information in which the user has requested the image forming operation on the document, information of a result of the image forming operation, print setting information regarding a document actually printed according to the image forming operation, or the like.

Based on the history information, the server 20 may calculate a cost of the image forming operation. Referring to block 131 of FIG. 1B, the electronic apparatus 10 may obtain print setting information 132 (e.g., A4: 5 sheets, print 2 pages per side, print one-sided, and print black and white). The electronic apparatus 10 may transmit the print setting information 132 to the server 20. By confirming the history information, the server 20 may confirm whether the image forming operation has been normally performed or not. When the image forming operation has been normally performed, the server 20 may calculate the cost (e.g., 1500 won), based on the print setting information, and may transmit cost calculation information 133 to the electronic apparatus 10.

Figure 2:
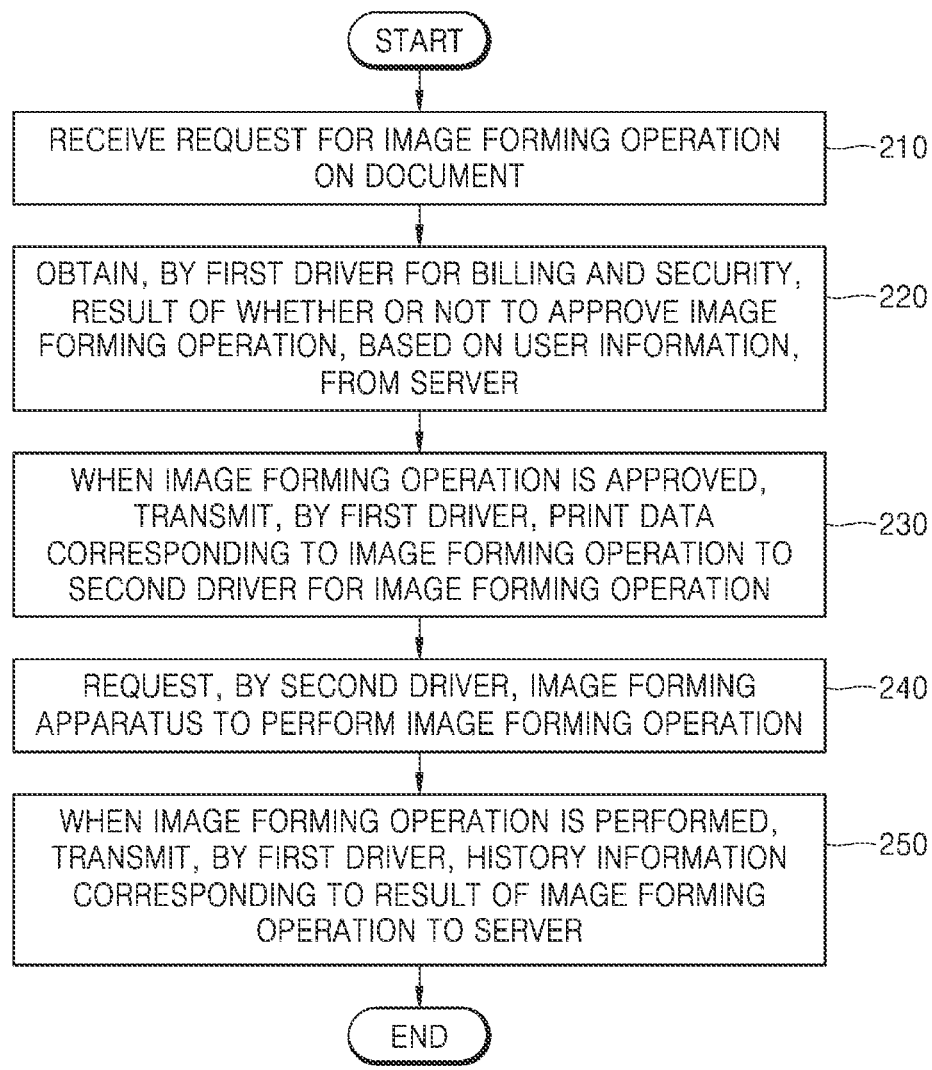
FIG. 2 is a flowchart illustrating a method of operating an electronic apparatus to request an image forming apparatus to perform an approved image forming operation and transmit history information corresponding to a result of the image forming operation to a server according to an example.

FIG. 2 is a flowchart illustrating a method of operating an electronic apparatus to request an image forming apparatus to perform an approved image forming operation and transmit history information corresponding to a result of the image forming operation to a server according to an example.

Referring to FIG. 2, the electronic apparatus 10 may receive a request for an image forming operation on a document in operation 210. For example, the image forming operation may be an operation of printing a document.

In operation 220, a first driver for billing and security may obtain a result of whether or not to approve the image forming operation from the server 20, based on user information. In an example, the first driver for billing and security is installed in the electronic apparatus 10.

For example, the first driver may transmit user information and level information of the document to the server 20. The first driver may receive, from the server 20, a result of whether or not to approve the image forming operation determined based on the user information and the level information.

For example, the user information may include information identifying a user and access authority information regarding a certain document. The level information may include information of a level set according to information included in the document.

For example, whether or not to approve the image forming operation may be determined based on a result of comparing an authority level corresponding to access authority information of a user and a level of the document with each other. As an example, when the authority level is equal to or higher than the level of the document, the electronic apparatus 10 may obtain a command permitting the image forming operation. On the other hand, when the authority level is lower than the level of the document, the electronic apparatus 10 may obtain a command not permitting the image forming operation.

For example, when the image forming operation is disapproved, the electronic apparatus 10 may display a message indicating that the image forming operation on the document is not allowed. In this case, the electronic apparatus 10 may transmit information requesting permission (e.g., temporary permission) for the image forming operation of the document to the server 20, based on an input of the user. When a response permitting the image forming operation of the document is received from the server 20, the electronic apparatus 10 may perform operation 230 of the electronic apparatus 10.

For example, when the result of whether or not to approve the image forming operation indicates approval for the image forming operation, the first driver may obtain print setting information, which is used to compute a cost for the image forming operation based on print data. For example, print setting information may include page range information of the document, page layout information of the document, print style information regarding the document, information about whether or not to perform a color operation on the document, or the like. The first driver may transmit the print setting information to the server 20.

For example, page range information of the document may include information regarding a page range for which the operation is requested in the document. Page layout information of the document may include information of the number of pages printed on one side of printing paper. Print style information regarding the document may include information regarding double-sided printing or single-sided printing.

For example, the electronic apparatus 10 may transmit thumbnail data regarding the document to the server 20. For example, a thumbnail may refer to a reduced image for the document. In addition, the thumbnail may be generated by converting the thumbnail data. For example, the thumbnail may be used when a history of the image forming operation on the document is verified on the server 20.

In operation 230, when the image forming operation is approved, the first driver may transmit print data corresponding to the image forming operation to a second driver for a certain image forming operation.

For example, the first driver may add data in which user information is encrypted to print data and may transmit print data to which the data has been added to the second driver. For example, the data may include electronic code data corresponding to an electronic code, which is used to confirm a history of the user having requested the image forming operation. For example, the electronic code may be an electronic code encrypted based on an encryption key generated using user information.

For example, while the electronic apparatus 10 is connected to the server 20 through a network, when a request for an image forming operation is received, the electronic apparatus 10 may control the first driver in an activation state and may control the second driver in an inactivation state. In addition, when a first image forming operation on a first document other than an image forming operation based on the network is separately received, the electronic apparatus 10 may control the second driver in an activation state.

In operation 240, the second driver may request the image forming apparatus 30 to perform the image forming operation. For example, when the second driver receives the print data, the second driver may be controlled in an activation state. For example, the image forming apparatus 30 may be an image forming apparatus 30 connected to the electronic apparatus 10 and not connected to the server 20. For example, the image forming apparatus 30 may be a personal image forming apparatus of the user or a public image forming apparatus located externally from a company.

For example, the second driver may transmit print data to which data in which user information is encrypted has been added to the image forming apparatus 30. The image forming apparatus 30 may receive the print data, and may perform the image forming operation, based on the received print data.

In operation 250, when the image forming operation is performed, the first driver may transmit history information corresponding to a result of the image forming operation to the server 20.

For example, when the image forming operation is performed, the first driver may obtain status information of the image forming apparatus 30. For example, status information of the image forming apparatus 30 may be information indicating a status after the image forming apparatus 30 performs the image forming operation. For example, when the image forming operation is normally completed, status information of the image forming apparatus 30 may be information indicating a ready state. On the other hand, when the image forming operation is abnormally completed, status information of the image forming apparatus 30 may be information indicating an error state.

For example, the first driver may confirm whether the image forming operation has been normally completed or not, based on status information of the image forming apparatus 30, and may obtain history information corresponding to a result of the image forming operation. The first driver may transmit the history information to the server 20.

For example, the history information may include information in which the user has requested the image forming operation on the document, information of a result of the image forming operation, print setting information regarding a document actually printed according to the image forming operation, or the like.

For example, when the status information indicates information in which the image forming operation has been normally completed, the first driver may request the server 20 for cost calculation of the image forming operation, based on the print setting information.

For example, when the status information indicates information in which the image forming operation has been abnormally completed, the first driver may obtain print setting information regarding a document actually printed according to the image forming operation. For example, the electronic apparatus 10 may display a screen for receiving print setting information regarding an actually printed document, and may obtain the print setting information, based on a user input. The first driver may request the server 20 for cost calculation of the image forming operation, based on the print setting information regarding an actually printed document.

Figure 3:
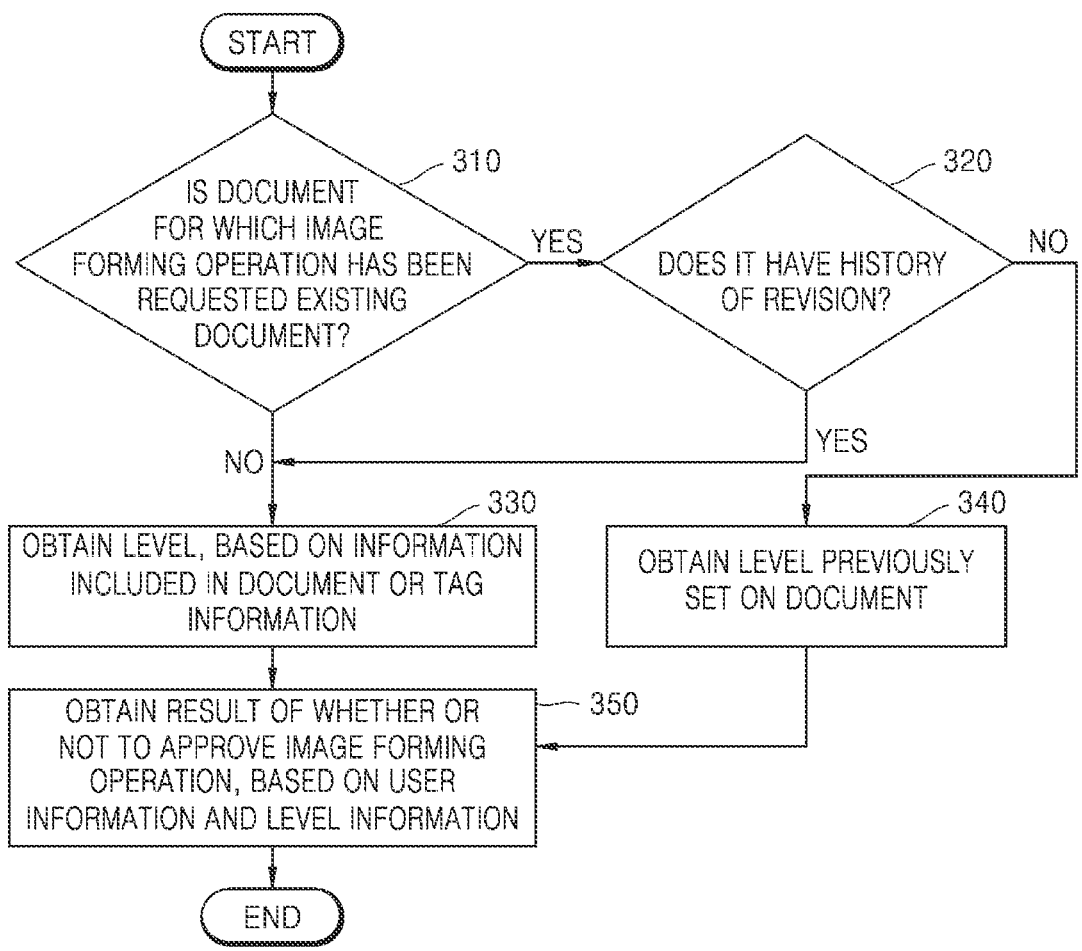
FIG. 3 is a diagram for describing a process of obtaining a result of whether or not to approve an image forming operation according to an example.

FIG. 3 is a diagram for describing a process of obtaining a result of whether or not to approve an image forming operation according to an example. For example, FIG. 3 may be a flowchart of example operations of operation 210 of the electronic apparatus 10 described with reference to FIG. 2.

Referring to FIG. 3, a first driver installed in the electronic apparatus 10 may confirm whether a document for which an image forming operation is requested is an existing document or not in operation 310. In this regard, the existing document may be a document stored in the electronic apparatus 10 prior to a certain time, a document received from the external server 20, a document on which an image forming operation has been already performed, etc.

When the document is the existing document, the first driver may confirm whether the document has a history of revision or not in operation 320. When certain information in the document changes, a level of the document may change, and accordingly, the first driver may monitor whether the document has a history of revision or not.

When the document is not the existing document, or the document has a history of revision, the first driver may obtain a level of the document, based on information included in the document or tag information in operation 330.

For example, the first driver may confirm whether the document has previously set information or not, based on a result of reading the document. For example, previously set information may be a word, a sentence, an image, etc. required for security. For example, the first driver may read a first document through an optical character reader (OCR). The first driver may determine a level of the document, based on whether the document includes the previously set information or not or how often the previously set information is written in the document.

For example, tag information of the document may refer to a word or a keyword assigned to the document. For example, tag information of the document may be information stored in a name of the document. For example, when the name of the document includes "confidential," the first driver may determine a level of the document as a level corresponding to "confidential."

When the document has no history of revision, the first driver may obtain a level previously set on the document in operation 340. In this regard, level information of the document may be previously stored in the electronic apparatus 10.

In operation 350, the first driver may obtain a result of whether or not to approve the image forming operation, based on user information and the level information. For example, the user information may include information identifying a user and access authority information regarding a certain document. The access authority information may include information of an authority level allowing a user to access a certain document.

For example, when the authority level is equal to or higher than a first level, the first driver may obtain a command permitting the image forming operation. On the other hand, when the authority level is lower than the first level, the first driver may obtain a command not permitting the image forming operation.

The server 20 may also perform operations 310 to 350 in the same manner. For example, the server 20 may receive a request for approval for an image forming operation on a document from the electronic apparatus 10. The server 20 may receive user information and document information from the electronic apparatus 10. For example, document information may include information included in the document and print data regarding the document.

For example, the server 20 may obtain level information of the document, based on the document information. The server 20 may obtain a result of whether or not to approve the image forming operation, based on the user information and the level information. The server 20 may transmit the result of whether or not to approve the image forming operation to the electronic apparatus 10.

Figure 4:
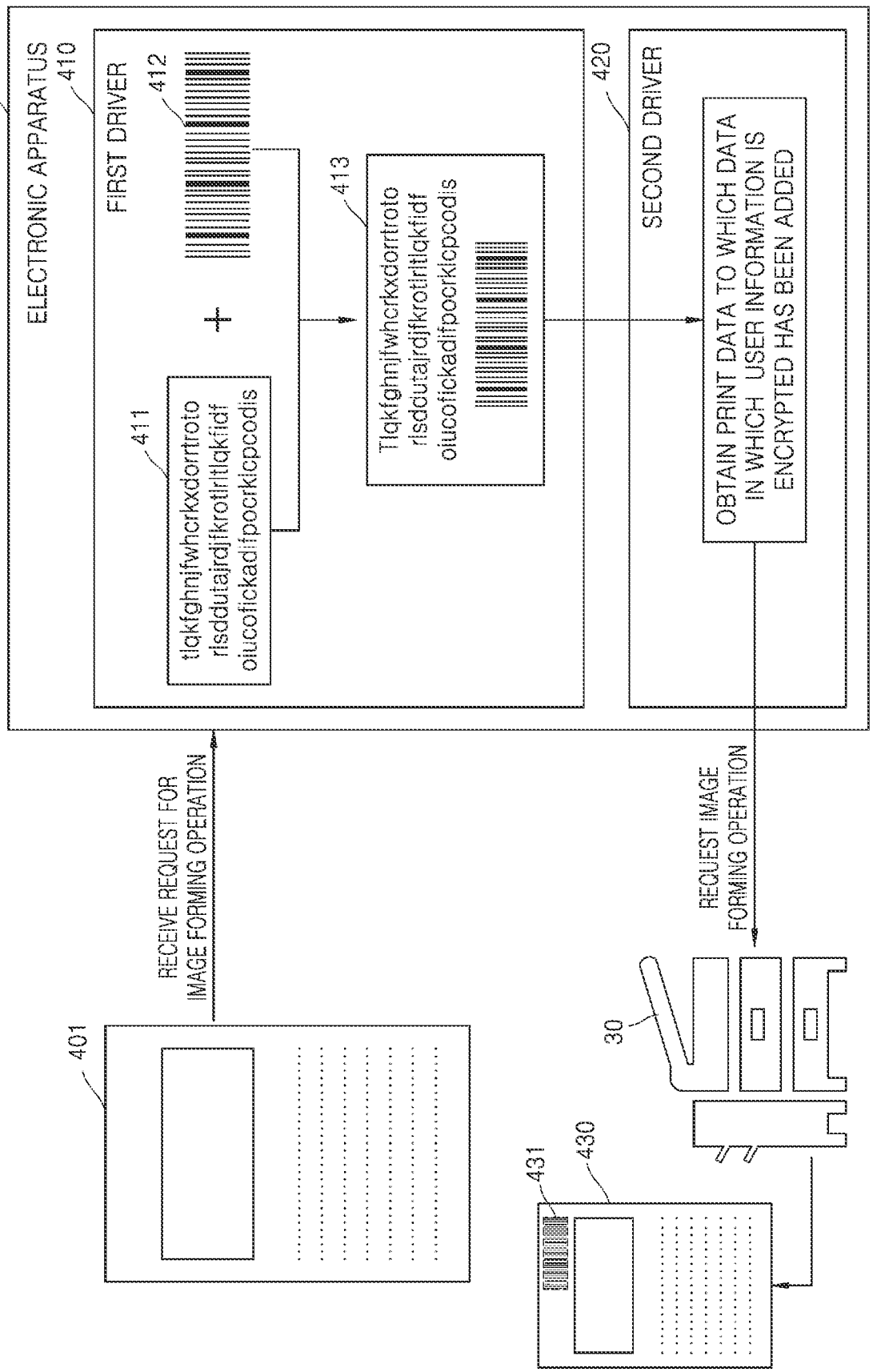
FIG. 4 is a diagram for describing a process in which an electronic apparatus requests an image forming apparatus to perform an image forming operation according to an example.

FIG. 4 is a diagram for describing a process in which an electronic apparatus requests an image forming apparatus to perform an image forming operation according to an example.

Referring to FIG. 4, the electronic apparatus 10 may receive a request for an image forming operation on a document 401 through a user interface unit. For example, in an environment in which a user works from home or non-face-to-face (e.g., remotely), the electronic apparatus 10 may receive a request for an image forming operation on the document 401. For example, when the document 401 is a company's internal document, a security check on the document 401 and a cost calculation for output of the document 401 may be performed. In that case, the electronic apparatus 10 may control a first driver 410 for billing and security of a document in an activation state. For example, while being connected to the server 20 to process billing of a document and check security of a document through a network, the electronic apparatus 10 may control the first driver 410 in an activation state. In this case, the electronic apparatus 10 may control a second driver 420 in an inactivation state. However, when a document for which an image forming operation is requested by the electronic apparatus 10 is not a target document requiring billing processing and security, the electronic apparatus 10 may control the second driver 420 in an activation state.

For example, the first driver 410 may obtain a result of whether or not to approve the image forming operation, based on user information. For example, the first driver 410 may obtain a result of whether or not to approve the image forming operation on the document 401 according to example operations 310 to 350 described with reference to FIG. 3, In addition, the first driver 410 may receive a result of whether or not to approve the image forming operation on the document 401 from the server 20. In this regard, whether or not to approve the image forming operation on the document 401 may be determined by the server 20.

When the image forming operation is approved, the first driver 410 may obtain print data 411 corresponding to the image forming operation. In addition, the first driver 410 may obtain data in which user information is encrypted. For example, the first driver 410 may receive data in which user information is encrypted from the server 20. For example, data in which user information is encrypted may include electronic code data corresponding to an electronic code 412. In addition, data in which user information is encrypted may be used to confirm a history of the user having requested the image forming operation.

For example, the first driver 410 may add data in which user information is encrypted to the print data 411 and may transmit data to which data in which user information is encrypted has been added to the second driver 420. As an example, the first driver 410 may add electronic code data corresponding to the electronic code 412 in which user information is encrypted to the print data 411 and thus may generate print data 413 to which the electronic code data has been added. The first driver 410 may transmit the print data 413 to which the electronic code data has been added to the second driver 420.

For example, the second driver 420 may receive print data corresponding to the image forming operation of the document 401 from the first driver 410. When the second driver 420 receives the print data, the second driver 420 may be controlled in an activation state. The second driver 420 may request the image forming apparatus 30 connected to the electronic apparatus 10 to perform the image forming operation, based on the print data. In this regard, the image forming apparatus 30 may be a personal image forming apparatus of the user or a public image forming apparatus used outside the company. For example, the second driver 420 may transmit the print data 413 to which electronic code data corresponding to the electronic code 412 has been added to the image forming apparatus 30.

For example, the image forming apparatus 30 may perform the image forming operation, based on the print data received from the second driver 420. As an example, the image forming apparatus 30 may output a printout 430 including the electronic code 431 in the document 401, based on the print data 413.

Figure 5:
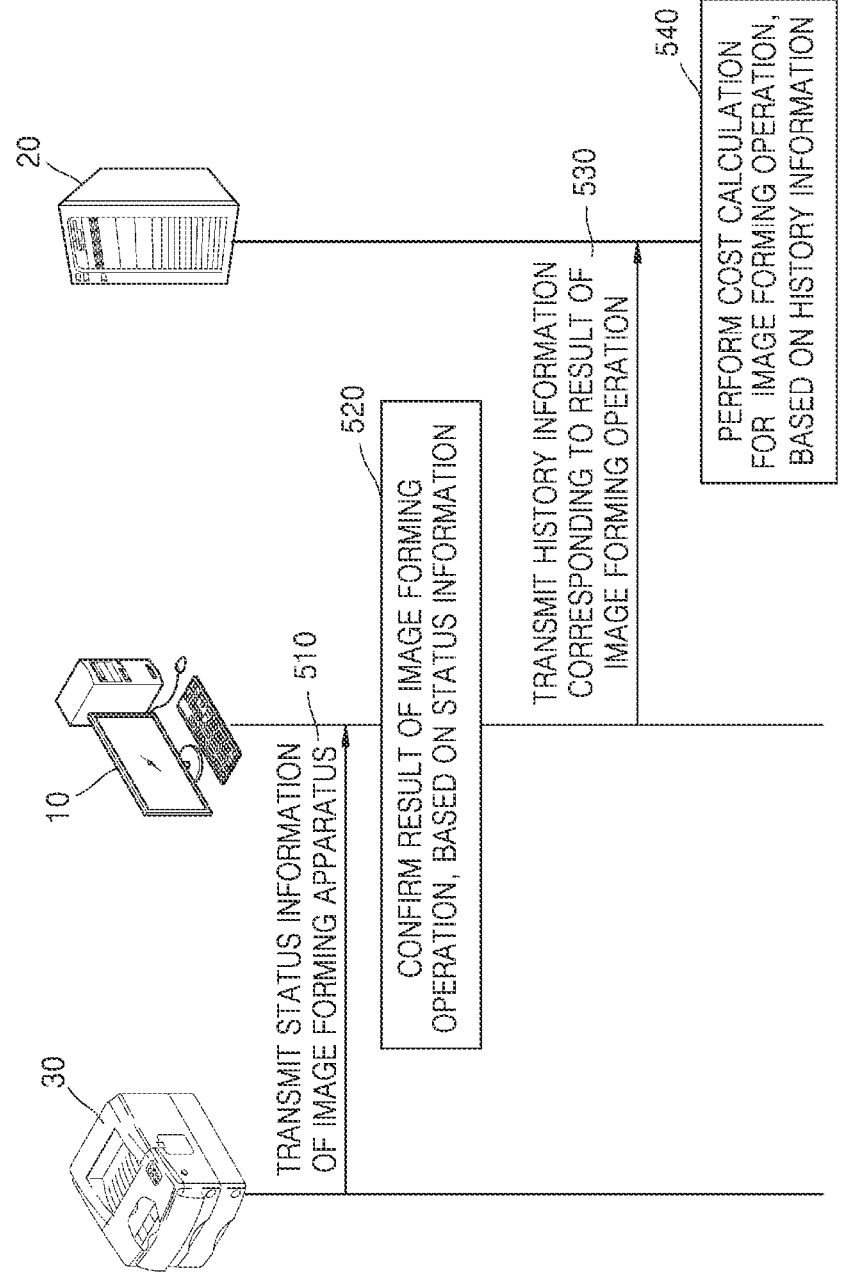
FIG. 5 is a diagram for describing a process of calculating a cost for an image forming operation, based on status information of an image forming apparatus according to an example.

FIG. 5 is a diagram for describing a process of calculating a cost for an image forming operation, based on status information of an image forming apparatus according to an example.

Referring to FIG. 5, when an image forming operation of a document is performed in the image forming apparatus 30, the electronic apparatus 10 may receive status information of the image forming apparatus 30 from the image forming apparatus 30 in operation 510. The status information may be information indicating a status after the image forming apparatus 30 performs the image forming operation. For example, when the image forming operation is normally completed, status information of the image forming apparatus 30 may be information indicating a ready state. On the other hand, when the image forming operation is abnormally completed, status information of the image forming apparatus 30 may be information indicating an error state.

In operation 520, the electronic apparatus 10 may confirm a result of the image forming operation, based on the status information. For example, when the status information is information indicating a ready state of the image forming apparatus 30, the electronic apparatus 10 may confirm that the image forming operation has been normally completed. On the other hand, when the status information is information indicating an error state of the image forming apparatus 30, the electronic apparatus 10 may confirm that the image forming operation has been abnormally completed.

In operation 530, the electronic apparatus 10 may transmit history information corresponding to the result of the image forming operation to the server 20. For example, the history information may include information in which a user has requested the image forming operation on the document, information of the result of the image forming operation, print setting information regarding a document actually printed according to the image forming operation, or the like.

In operation 540, the server 20 may calculate a cost for the image forming operation, based on the history information. For example, when information of the result of the image forming operation included in the history information indicates that the image forming operation has been normally completed, the server 20 may calculate a cost for the image forming operation, based on print setting information. For example, print setting information may be previously received from the electronic apparatus 10 before the image forming operation is performed.

For example, when information of the result of the image forming operation included in the history information indicates that the image forming operation has been abnormally completed, the server 20 may obtain print setting information regarding an actually printed document. For example, the history information may include print setting information regarding an actually printed document. For example, print setting information regarding an actually printed document may include range information of an actually printed page, page layout information, style information, information about whether or not to perform a color operation, or the like.

The server 20 may calculate a cost for the image forming operation, based on cost calculation standard information and history information stored in the server 20.

FIG. 6 is a diagram showing a user interface displayed on an electronic apparatus when an image forming operation is abnormally completed according to an example.

Referring to FIG. 6, when an image forming operation is performed in the image forming apparatus 30, the electronic apparatus 10 may receive status information of the image forming apparatus 30 from the image forming apparatus 30. The electronic apparatus 10 may obtain history information corresponding to a result of the image forming operation, based on the status information. The electronic apparatus 10 may transmit the history information to the server 20. In this case, when a document for which the image forming operation has been performed is a document subject to cost calculation, the electronic apparatus 10 may request the server 20 to calculate a cost of the image forming operation, based on the history information.

For example, when status information of the image forming apparatus 30 indicates that the image forming apparatus 30 is in an error state, the electronic apparatus 10 may confirm that the image forming operation has been abnormally completed. The electronic apparatus 10 may display a user interface for calculating a cost of the image forming operation. As shown in FIG. 6, the electronic apparatus 10 may display a user interface including an input box 610 for inputting a number of pages actually printed in the image forming apparatus 30. The electronic apparatus 10 may receive information of the number of actually printed pages through the input box 610. The electronic apparatus 10 may transmit the information of the number of actually printed pages to the server 20. The server 20 may calculate a cost of the image forming operation, based on the information of the number of actually printed pages and previously set cost calculation standard information.

Figure 7:
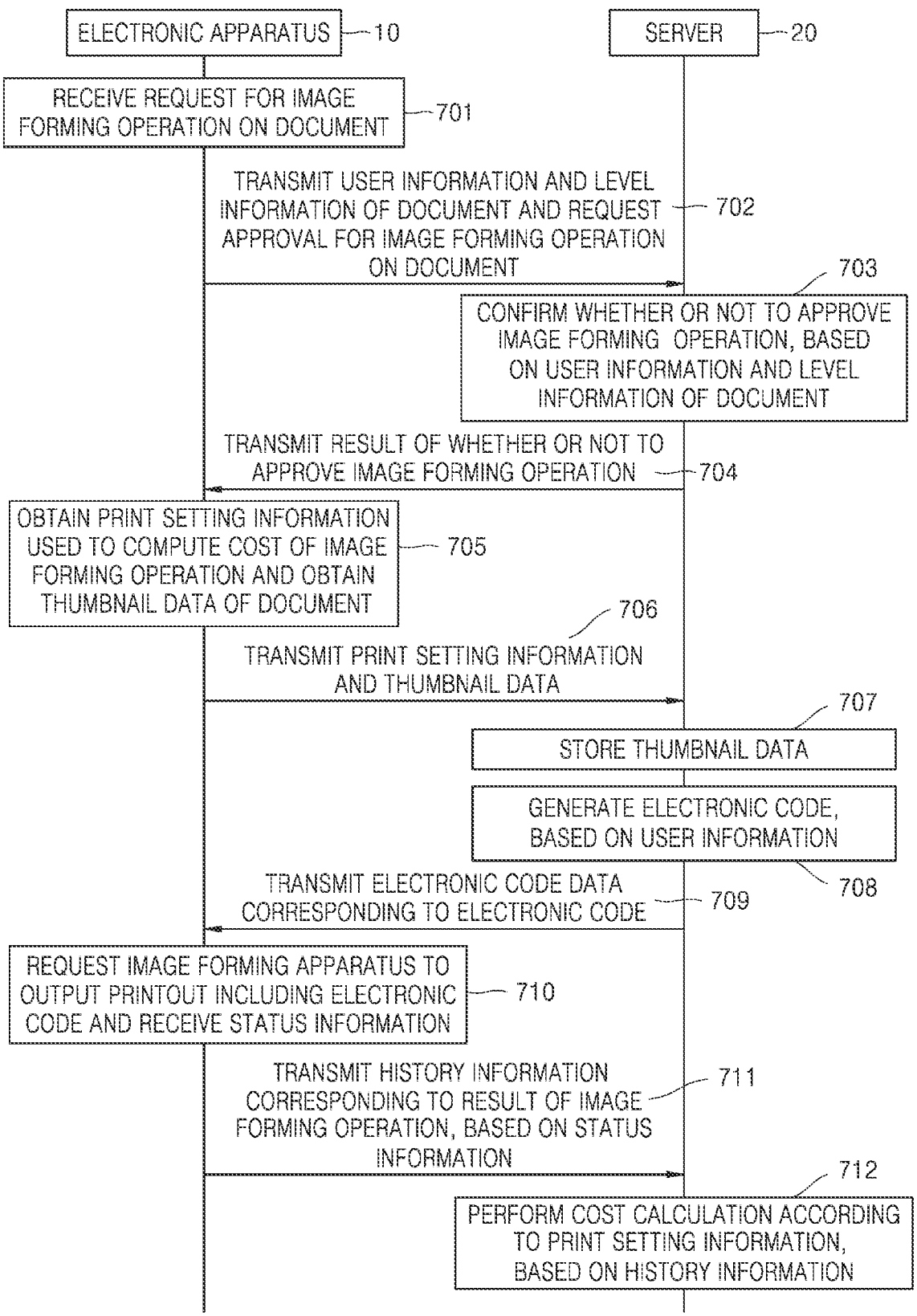
FIG. 7 is a flowchart for describing operations of an electronic apparatus and a server according to an example.

FIG. 7 is a flowchart for describing operations of an electronic apparatus and a server according to an example.

Referring to FIG. 7, the electronic apparatus 10 may receive a request for an image forming operation on a document in operation 701. In operation 702, the electronic apparatus 10 may transmit user information and level information of the document to the server 20. In addition, the electronic apparatus 10 may request the server 20 to approve the image forming operation on the document.

In operation 703, the server 20 may confirm whether or not to approve the image forming operation, based on the user information and the level information of the document. For example, the server 20 may obtain the level information of the document, based on document information. As an example, the server 20 may obtain authority level information allowing a user to access a certain document from the user information. The server 20 may determine whether or not to approve the image forming operation, based on a result of comparing the authority level information and the level information of the document with each other. In operation 704, the server 20 may transmit a result of whether or not to approve the image forming operation to the electronic apparatus 10.

In operation 705, the electronic apparatus 10 may obtain print setting information used to compute a cost of the image forming operation and thumbnail data of the document. In operation 706, the electronic apparatus 10 may transmit the print setting information and the thumbnail data to the server 20.

In operation 707, the server 20 may store the thumbnail data. In operation 708, the server 20 may generate an electronic code, based on the user information. In this regard, the electronic code may be a code which is used to confirm a history of a user having requested the image forming operation. For example, the electronic code may include information of a user having requested the image forming operation and the print setting information. For example, the electronic code may be an electronic code in which the user information is encrypted based on an encryption key generated using the user information. In addition, the electronic code may be an electronic code in which the user information and the print setting information are encrypted using an encryption key. In operation 709, the server 20 may transmit electronic code data corresponding to the electronic code to the electronic apparatus 10.

In an example, the server 20 may obtain a thumbnail image for the document, based on the thumbnail data. The server 20 may insert the electronic code into the thumbnail image and may store a thumbnail image in which the electronic code is inserted. The stored thumbnail image may be used to perform an operation of identifying a user having output a printout for the document or cost calculation of the printout. For example, in a case where the electronic code includes the user information, when a printout of the document and the thumbnail image match each other, the printout of the document may be determined as being output by the user. In a case where the electronic code includes the user information and the print setting information, when a printout of the document and the thumbnail image match each other, the printout of the document may be confirmed as being output by the user, and cost calculation may be performed according to the print setting information.

In operation 710, the electronic apparatus 10 may request the image forming apparatus 30 to output a printout including the electronic code. For example, the electronic apparatus 10 may insert electronic code data corresponding to the electronic code into print data of the document. The electronic apparatus 10 may transmit print data in which the electronic code data is inserted to the image forming apparatus 30. Afterwards, the electronic apparatus 10 may receive status information of the image forming apparatus 30 from the image forming apparatus 30.

In operation 711, the electronic apparatus 10 may transmit history information corresponding to a result of the image forming operation to the server 20, based on the status information. As an example, the electronic apparatus 10 may confirm a result of the image forming operation, based on the status information, and may generate history information corresponding to the result of the image forming operation. For example, the history information may include information in which the user has requested the image forming operation on the document, information of the result of the image forming operation, print setting information regarding a document actually printed according to the image forming operation, or the like.

In operation 712, the server 20 may perform cost calculation according to the print setting information, based on the history information. For example, when information of the result of the image forming operation included in the history information indicates that the image forming operation has been normally completed, the server 20 may calculate a cost for the image forming operation, based on the print setting information. On the other hand, when information of the result of the image forming operation included in the history information indicates that the image forming operation has been abnormally completed, the server 20 may calculate a cost for the image forming operation, based on print setting information regarding an actually printed document.

Figure 8:
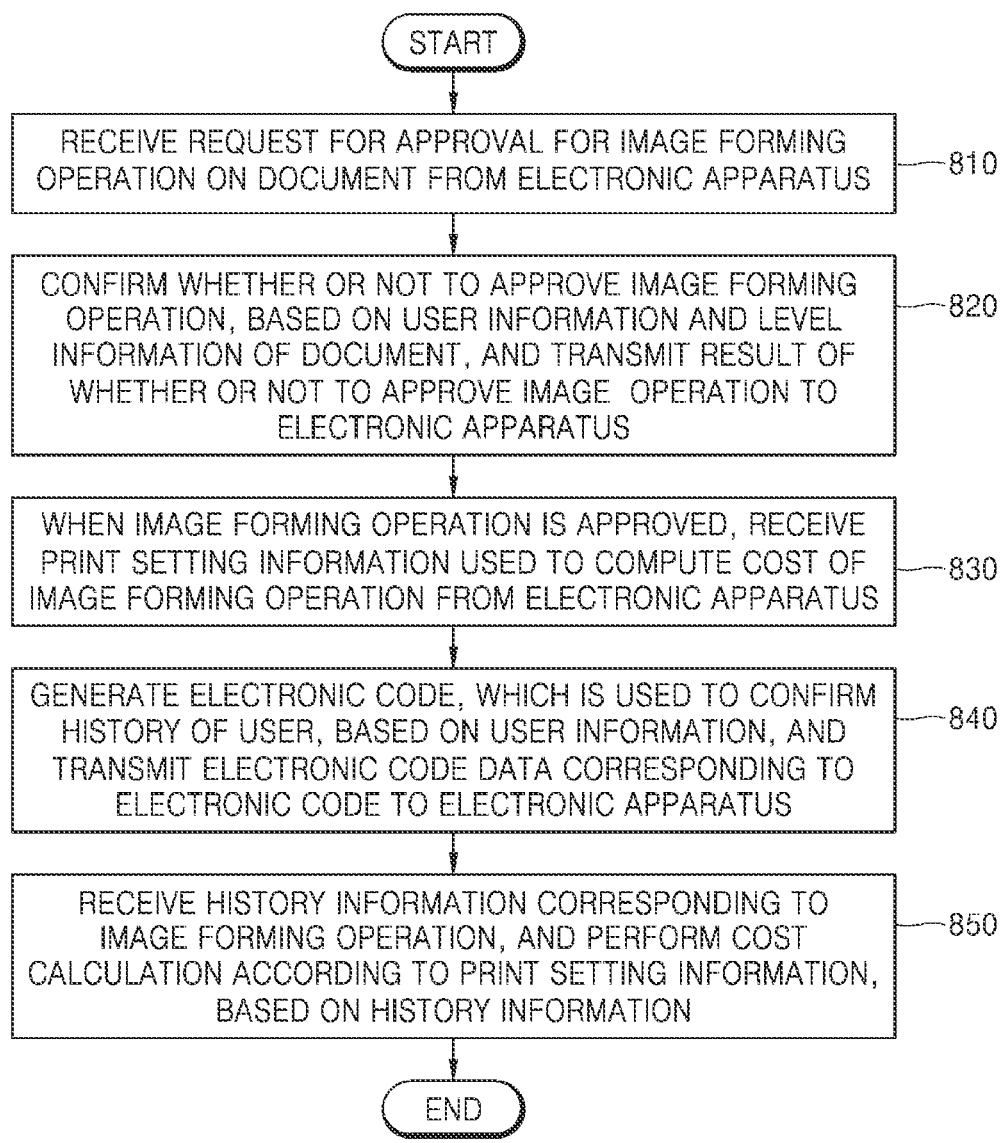
FIG. 8 is a flowchart illustrating a method of operating a server according to an example.

FIG. 8 is a flowchart illustrating a method of operating a server according to an example.

Referring to FIG. 8, the server 20 may receive a request for approval for an image forming operation on a document from the electronic apparatus 10 in operation 810. As an example, the server 20 may receive a request for approval for an image forming operation of a document from the electronic apparatus 10 through a network. In this regard, the network may be a network for performing communication between the electronic apparatus 10 of a user and the server 20 in a remote (e.g., home) working environment or a non-face-to-face working environment.

In operation 820, the server 20 may confirm whether or not to approve the image forming operation, based on user information and level information of the document, and may transmit a result of whether or not to approve the image forming operation to the electronic apparatus 10.

In operation 830, when the image forming operation is approved, the server 20 may receive print setting information used to compute a cost of the image forming operation from the electronic apparatus 10. The server 20 may store the print setting information.

In addition, the server 20 may receive thumbnail data regarding the document from the electronic apparatus 10. The server 20 may generate a thumbnail image, based on the thumbnail data, and may store the thumbnail image.

In operation 840, the server 20 may generate an electronic code, which is used to confirm a history of the user, based on the user information. The server 20 may store the electronic code and may transmit electronic code data corresponding to the electronic code to the electronic apparatus 10.

In operation 850, the server 20 may receive history information corresponding to the image forming operation. The server 20 may perform cost calculation according to a print setting, based on the history information.

Figure 9:
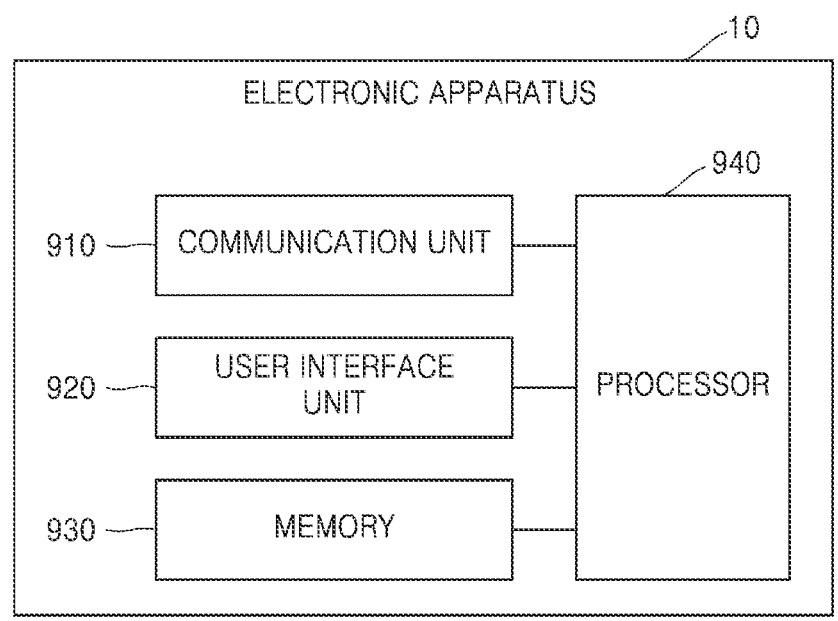
FIG. 9 is a block diagram of an electronic apparatus according to an example.

FIG. 9 is a block diagram of an electronic apparatus according to an example.

Referring to FIG. 9, the electronic apparatus 10 may include a communication unit 910, a user interface unit 920, a memory 930, and a processor 940. However, the illustrated elements are not essential. The electronic apparatus 10 may be implemented to include more or fewer elements than those illustrated in FIG. 9. Examples of the various elements will be described hereinafter.

The communication unit 910 (e.g., transceiver) may communicate with an external apparatus. As an example, the communication unit 910 may be connected to a network by wire or wirelessly to communicate with an external apparatus. In this regard, the external apparatus may be an image forming apparatus, a server, etc.

The user interface unit 920 may include an input unit for receiving an input for controlling an operation of the electronic apparatus 10 from a user and an output unit for displaying information such as a result of an operation of the electronic apparatus 10, status of the electronic apparatus 10, or the like. For example, the user interface unit 920 may include an operation panel for receiving a user input, a display panel for displaying a screen, etc.

The memory 930 may store software, a program, etc. For example, the memory 930 may store a program related to an example operation of the electronic apparatus 10 described with reference to FIGS. 1A to 8.

The processor 940 may execute the program stored in the memory 930, may read data or a file stored in the memory 930, or may store a new file in the memory 930. The processor 940 may execute instructions stored in the memory 930.

The processor 940 may receive a request for an image forming operation on a document through the user interface unit 920. For example, the image forming operation may be an operation of printing a document.

The processor 940 may control an operation of a first driver and a second driver installed in the electronic apparatus 10. For example, when the electronic apparatus 10 is connected to a server through a network, the processor 940 may control the first driver in an activation state. On the other hand, when the electronic apparatus 10 is disconnected from communication with a server, the processor 940 may control the first driver in an inactivation state. In addition, the processor 940 may independently control the first driver and the second driver. In addition, the processor 940 may control an activation state of the second driver according to whether the first driver is activated or not. For example, the processor 940 may control the first driver or the second driver to communicate with an external apparatus of the electronic apparatus 10 through the communication unit 910. The external apparatus may be an image forming apparatus or a server. In addition, the processor 940 may control the first driver or the second driver to perform an operation provided by each driver by using information obtained by the electronic apparatus 10.

For example, the first driver for billing and security may obtain a result of whether or not to approve the image forming operation from the server, based on user information.

For example, the first driver may transmit user information and level information of the document to the server. The first driver may receive a result of whether or not to approve the image forming operation, determined based on the user information and the level information from the server.

For example, the user information may include information identifying a user and access authority information regarding a certain document. The level information may include information of a level set according to information included in the document.

For example, whether or not to approve the image forming operation may be determined based on a result of comparing an authority level corresponding to access authority information of a user and a level of the document with each other. As an example, when the authority level is equal to or higher than the level of the document, the electronic apparatus 10 may obtain a command permitting the image forming operation. On the other hand, when the authority level is lower than the level of the document, the electronic apparatus may obtain a command not permitting the image forming operation.

For example, when the image forming operation is disapproved, the processor 940 may display, through the user interface unit 920, a message indicating that the image forming operation on the document is not allowed. In this case, the processor 940 may transmit information requesting permission (e.g., temporary permission) for the image forming operation of the document to the server, based on an input of the user. When a response permitting the image forming operation of the document is received from the server, the processor 940 may control operations of the first driver and the second driver to perform the image forming operation.

For example, when the result of whether or not to approve the image forming operation indicates approval for the image forming operation, the first driver may obtain print setting information, which is used to compute a cost for the image forming operation based on print data. For example, print setting information may include page range information of the document, page layout information of the document, print style information regarding the document, information about whether or not to perform a color operation on the document, or the like. The first driver may transmit the print setting information to the server.

For example, page range information of the document may be information regarding a page range for which the operation is requested in the document. Page layout information of the document may be information of the number of pages printed on one side of printing paper. Print style information regarding the document may be information regarding double-sided printing or single-sided printing.

For example, the first driver may transmit thumbnail data regarding the document to the server. For example, a thumbnail may refer to a reduced image for the document. In addition, the thumbnail may be generated by converting the thumbnail data. For example, the thumbnail may be used when a history of the image forming operation on the document is verified on the server.

When the image forming operation is approved, the first driver may transmit print data corresponding to the image forming operation to the second driver for a certain image forming operation.

For example, the first driver may add data in which user information is encrypted to print data and may transmit print data to which the data has been added to the second driver. For example, the data may include electronic code data corresponding to an electronic code, which is used to confirm a history of the user having requested the image forming operation. For example, the electronic code may be an electronic code encrypted based on an encryption key generated using user information.

For example, while the electronic apparatus 10 is connected to the server through a network, when a request for an image forming operation is received, the processor 940 may control the first driver in an activation state and may control the second driver in an inactivation state. In addition, when a first image forming operation on a first document other than an image forming operation based on the network is separately received, the processor 940 may control the second driver in an activation state.

The second driver may request an image forming apparatus to perform the image forming operation. For example, when the second driver receives the print data, the second driver may be controlled in an activation state. For example, the image forming apparatus may be an image forming apparatus connected to the electronic apparatus 10 and not connected to the server. For example, the image forming apparatus may be a personal image forming apparatus of the user or a public image forming apparatus for external use.

For example, the second driver may transmit print data to which data in which user information is encrypted has been added to the image forming apparatus. The image forming apparatus may receive the print data, and may perform the image forming operation, based on the received print data.

When the image forming operation is performed, the first driver may transmit history information corresponding to a result of the image forming operation to the server.

For example, when the image forming operation is performed, the first driver may obtain status information of the image forming apparatus. In this case, the first driver may directly receive status information of the image forming apparatus from the image forming apparatus. In addition, when the second driver receives status information of the image forming apparatus from the image forming apparatus, the first driver may receive the status information of the image forming apparatus from the second driver.

For example, status information of the image forming apparatus may be information indicating status after the image forming apparatus performs the image forming operation. For example, when the image forming operation is normally completed, status information of the image forming apparatus may be information indicating a ready state. On the other hand, when the image forming operation is abnormally completed, status information of the image forming apparatus may be information indicating an error state.

For example, the first driver may confirm whether the image forming operation has been normally completed or not, based on status information of the image forming apparatus, and may obtain history information corresponding to a result of the image forming operation. The first driver may transmit the history information to the server.

For example, the history information may include information in which the user has requested the image forming operation on the document, information of a result of the image forming operation, print setting information regarding a document actually printed according to the image forming operation, or the like.

For example, when the status information indicates information in which the image forming operation has been normally completed, the first driver may request the server for cost calculation of the image forming operation, based on the print setting information.

For example, when the status information indicates information in which the image forming operation has been abnormally completed, the first driver may obtain print setting information regarding a document actually printed according to the image forming operation. For example, the user interface unit 920 may display a screen for receiving print setting information regarding an actually printed document, and may obtain the print setting information, based on a user input. The first driver may request the server for cost calculation of the image forming operation, based on the print setting information regarding an actually printed document.

Figure 10:
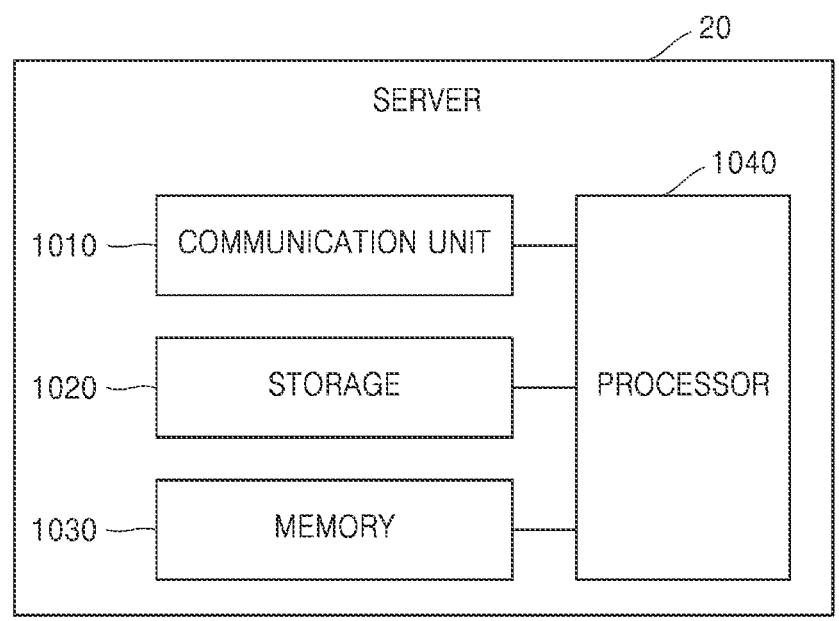
FIG. 10 is a block diagram of a server according to an example.

FIG. 10 is a block diagram of a server according to an example.

Referring to FIG. 10, the server 20 may include a communication unit 1010, a storage 1020, a memory 1030, and a processor 1040. However, the illustrated elements are not essential. The server 20 may be implemented to include more or fewer elements than those illustrated in FIG. 10. Examples of the various elements will be described hereinafter.

The communication unit 1010 (e.g., transceiver) may communicate with an external apparatus. As an example, the communication unit 1010 may be connected to a network by wire or wirelessly to communicate with an external apparatus. In this regard, the external apparatus may be an electronic apparatus, an image forming apparatus, etc.

The storage 1020 may store a plurality of pieces of user information and information of a document managed by the server 20. The storage 1020 may store information or data required for cost processing and security regarding an image forming operation performed externally.

The memory 1030 may store software, a program, etc. For example, the memory 1030 may store a program related to an example operation of the server 20 described with reference to FIGS. 1A to 9.

The processor 1040 may execute the program stored in the memory 1030, may read data or a file stored in the memory 1030, or may store a new file in the memory 1030. The processor 1040 may execute instructions stored in the memory 1030.

The communication unit 1010 may receive a request for approval for an image forming operation on a document from an electronic apparatus. As an example, the communication unit 1010 may receive a request for approval for an image forming operation of a document from an electronic apparatus through a network. In this regard, the network may be a network for performing communication between an electronic apparatus of a user and the server 20 in a home working environment or a non-face-to-face working environment (e.g., a remote environment).

The processor 1040 may confirm whether or not to approve the image forming operation, based on user information and level information of the document, and may transmit a result of whether or not to approve the image forming operation to the electronic apparatus through the communication unit 1010.

When the image forming operation is approved, the processor 1040 may receive print setting information used to compute a cost of the image forming operation from the electronic apparatus through the communication unit 1010. The storage 1020 may store the print setting information.

In addition, the communication unit 1010 may receive thumbnail data regarding the document from the electronic apparatus. The processor 1040 may generate a thumbnail image, based on the thumbnail data, and the storage 1020 may store the thumbnail image.

The processor 1040 may generate an electronic code, which is used to confirm a history of the user, based on the user information. The processor 1040 may store the electronic code in the storage 1020 and may transmit electronic code data corresponding to the electronic code to the electronic apparatus through the communication unit 1010.

The processor 1040 may receive history information corresponding to the image forming operation through the communication unit 1010. The processor 1040 may perform cost calculation according to print setting, based on the history information.

Figure 11:
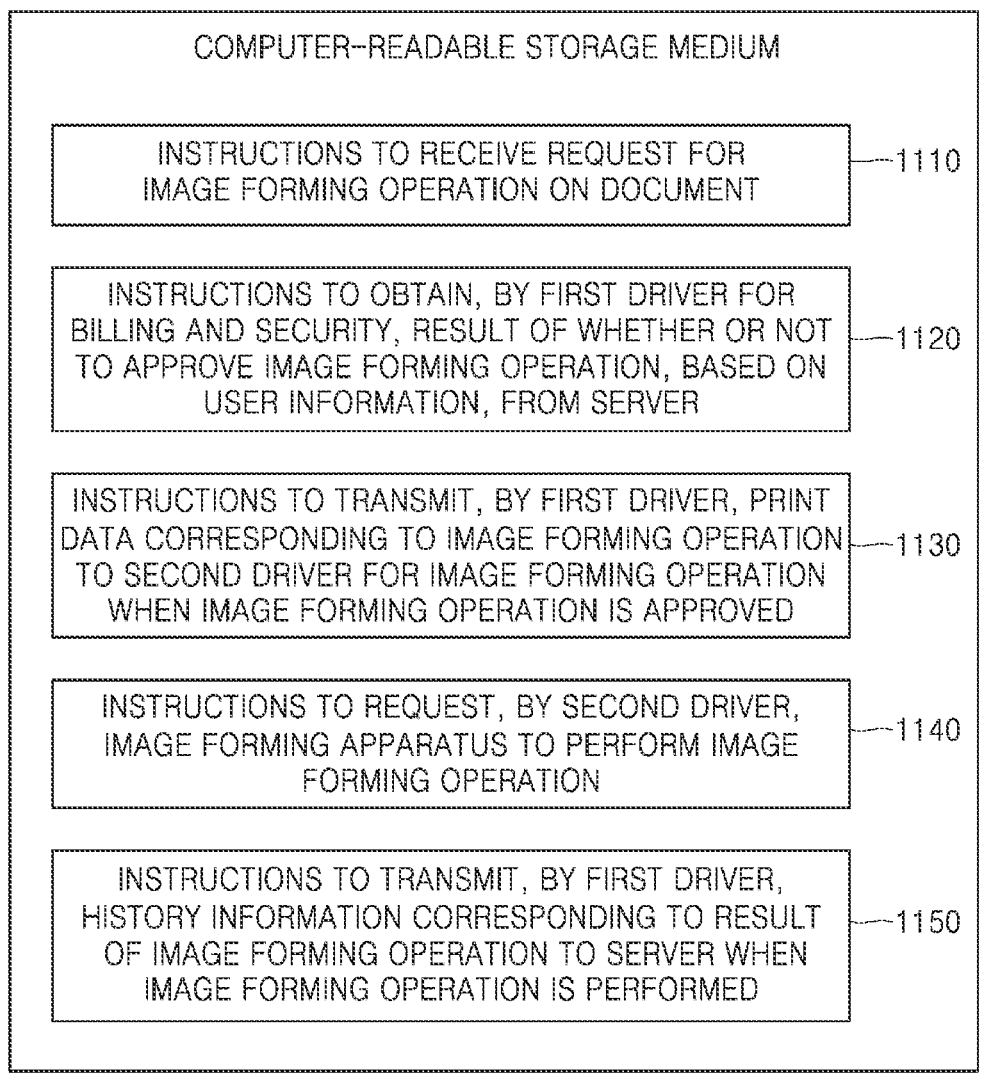
FIG. 11 is a diagram for describing instructions stored in a computer-readable storage medium according to an example.

FIG. 11 is a diagram for describing instructions stored in a computer-readable storage medium according to an example.

The computer-readable storage medium shown in FIG. 11 may store instructions related to example operations of the electronic apparatus 10 described with reference to FIGS. 1A to 9. For example, the computer-readable storage medium may include instructions 1110 to receive a request for an image forming operation on a document, instructions 1120 to obtain, by a first driver for billing and security, a result of whether or not to approve the image forming operation from a server, based on user information, instructions 1130 to transmit, by the first driver, print data corresponding to the image forming operation to a second driver for the image forming operation when the image forming operation is approved, instructions 1140 to request, by the second driver, an image forming apparatus to perform the image forming operation, and instructions 1150 to transmit, by the first driver, history information corresponding to a result of the image forming operation to the server when the image forming operation is performed.

Figure 12:
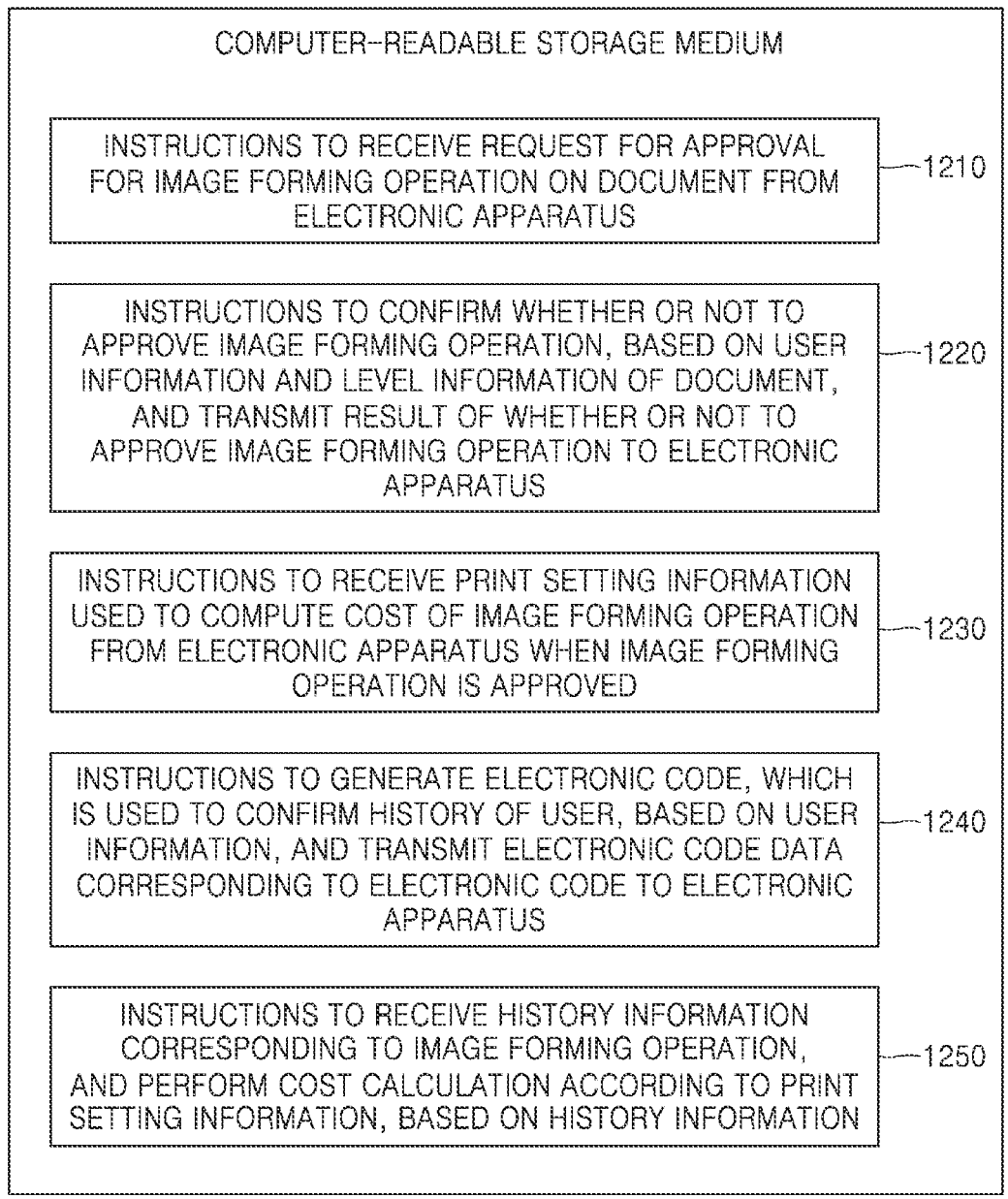
FIG. 12 is a diagram for describing instructions stored in a computer-readable storage medium according to an example.

FIG. 12 is a diagram for describing instructions stored in a computer-readable storage medium according to an example.

The computer-readable storage medium shown in FIG. 12 may store instructions related to example operations of the server 20 described with reference to FIGS. 1A to 10. For example, the computer-readable storage medium may include instructions 1210 to receive a request for approval for an image forming operation on a document from an electronic apparatus, instructions 1220 to confirm whether or not to approve the image forming operation, based on user information and level information of the document, and transmit a result of whether or not to approve the image forming operation to the electronic apparatus, instructions 1230 to receive print setting information used to compute a cost of the image forming operation from the electronic apparatus when the image forming operation is approved, instructions 1240 to generate an electronic code, which is used to confirm a history of a user, based on the user information, and transmit electronic code data corresponding to the electronic code to the electronic apparatus, and instructions 1250 to receive history information corresponding to the image forming operation, and perform cost calculation according to the print setting information, based on the history information.

Example methods of operating the electronic apparatus 10, the server 20, and the image forming apparatus 30 described above may be implemented in the form of a non-transitory computer-readable storage medium storing data or instructions executable by a computer or a processor. The example operating methods may be written as a program executable on a computer and may be implemented in a general-purpose digital computer operating the program by using a non-transitory computer-readable storage medium. The non-transitory computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks (SSDs), and any other devices capable of storing instructions or software, related data, a data file, and data structures, and providing the instructions or software, the related data, the data file, and the data structures to a processor or a computer so that the processor or the computer may execute the instructions.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. An electronic apparatus comprising:
   a communication unit;
   a user interface unit;
   a processor; and
   a memory to store instructions executable by the processor,
   wherein the processor, by executing the instructions, is to:
      receive, from the user interface unit, a request for an image forming operation on a document;
      obtain, by a first driver installed in the electronic apparatus, a result of whether or not to approve the image forming operation, based on user information, from a server through the communication unit;
      in a case where the image forming operation is approved, transmit, by the first driver, print data corresponding to the image forming operation to a second driver installed in the electronic apparatus for the image forming operation;
      request, by the second driver, an image forming apparatus to perform the image forming operation; and
      in a case where the image forming operation is performed, transmit, by the first driver, history information corresponding to a result of the image forming operation to the server through the communication unit.

2. The electronic apparatus of claim 1, wherein the processor, by executing the instructions, is to:
   transmit, by the first driver, the user information and level information of the document to the server through the communication unit; and
   receive, from the server, the result of whether or not to approve the image forming operation determined based on the user information and the level information.

3. The electronic apparatus of claim 2,
   wherein the user information comprises information identifying a user and access authority information regarding a certain document, and
   wherein the level information comprises information of a level set according to information comprised in the document.

4. The electronic apparatus of claim 1, wherein the processor, by executing the instructions is to, by the first driver, add data in which the user information is encrypted to the print data and transmit, to the second driver, print data to which the data has been added.

5. The electronic apparatus of claim 4, wherein the data comprises electronic code data corresponding to an electronic code, included in a printout of the print data, which is used to confirm a history of a user having requested the image forming operation.

6. The electronic apparatus of claim 1, wherein the processor, by executing the instructions, is to, in a case where the second driver receives the print data, control the second driver in an activation state.

7. The electronic apparatus of claim 1, wherein the processor, by executing the instructions, is to, while the electronic apparatus is connected to the server through a network, control the first driver in an activation state.

8. The electronic apparatus of claim 7, wherein, in a case where a request for a first image forming operation on a first document other than an image forming operation based on the network is received, the processor, by executing the instructions, is to control the second driver in an activation state and request, by the second driver, the image forming apparatus to perform the first image forming operation.

9. The electronic apparatus of claim 1,
   wherein the processor, by executing the instructions, is to obtain print setting information, which is used to compute a cost for the image forming operation, based on the print data, and
   wherein the print setting information comprises page range information of the document, page layout information of the document, print style information regarding the document, or information about whether or not to perform a color operation on the document.

10. The electronic apparatus of claim 9, wherein the processor, by executing the instructions, is to:
    in a case where the image forming operation is performed, obtain, by the first driver, status information of the image forming apparatus; and
    in a case where the status information indicates information in which the image forming operation has been normally completed, request, by the first driver, the server to calculate a cost of the image forming operation, based on the print setting information.

11. A method of operating an electronic apparatus, the method comprising:
    receiving a request for an image forming operation on a document;
    obtaining, by a first driver installed in the electronic apparatus, a result of whether or not to approve the image forming operation, based on user information, from a server;
    in a case where the image forming operation is approved, transmitting, by the first driver, print data corresponding to the image forming operation to a second driver installed in the electronic apparatus for the image forming operation;
    requesting, by the second driver, an image forming apparatus to perform the image forming operation; and
    in a case where the image forming operation is performed, transmitting, by the first driver, history information corresponding to a result of the image forming operation to the server.

12. The method of claim 11, wherein the transmitting of the print data to the second driver by the first driver in a case where the image forming operation is approved comprises, by the first driver, adding data in which the user information is encrypted to the print data and transmitting, to the second driver, print data to which the data has been added.

13. The method of claim 11, wherein the requesting, by the second driver, the image forming apparatus to perform the image forming operation comprises:
    receiving, by the second driver, the print data; and
    controlling the second driver in an activation state and requesting, by the second driver, the image forming apparatus to perform the image forming operation based on the print data.

14. The method of claim 11, further comprising:
in a case where the image forming operation is performed, obtaining, by the first driver, status information of the image forming apparatus; and
in a case where the status information indicates information in which the image forming operation has been normally completed, requesting, by the first driver, the server to calculate a cost of the image forming operation, based on print setting information corresponding to the print data.

15. A non-transitory machine-readable storage medium encoded with instructions, that when executed, cause a processor to:
receive a request for an image forming operation on a document;
obtain, by a first driver installed in an electronic apparatus, a result of whether or not to approve the image forming operation, based on user information, from a server;
transmit, by the first driver, print data corresponding to the image forming operation to a second driver installed in the electronic apparatus for the image forming operation in a case where the image forming operation is approved;
request, by the second driver, an image forming apparatus to perform the image forming operation; and
transmit, by the first driver, history information corresponding to a result of the image forming operation to the server in a case where the image forming operation is performed.

* * * * *